United States Patent [19]

Knödler et al.

[11] Patent Number: 4,485,443
[45] Date of Patent: Nov. 27, 1984

[54] TORQUE-CONTROL SYSTEM FOR AUTOMATIC SPEED CHANGER SHIFTABLE UNDER LOAD

[75] Inventors: Dietrich Knödler; Werner Boes, both of Friedrichshafen; Anton Ott, Tettnang; Kurt O. Venger, Friedrichshafen, all of Fed. Rep. of Germany

[73] Assignee: Zahnradfabrik Friedrichshafen Aktiengesellschaft, Friedrichshafen, Fed. Rep. of Germany

[21] Appl. No.: 267,700

[22] Filed: May 27, 1981

Related U.S. Application Data

[63] Continuation-in-part of Ser. No. 065,106, Aug. 9, 1979, abandoned.

[30] Foreign Application Priority Data

Aug. 10, 1978 [DE] Fed. Rep. of Germany ....... 2835051

[51] Int. Cl.³ .................... B60K 41/04; F16D 43/284; G06F 15/20
[52] U.S. Cl. .................... 364/424.1; 74/843; 74/861; 74/866; 74/752 A; 192/0.033
[58] Field of Search ............... 74/843, 866, 844, 861, 74/752 A, 752 D; 192/3.57, 3.58, 0.032, 0.033, 0.034, 103 R; 364/424.1

[56] References Cited

U.S. PATENT DOCUMENTS

| | | | |
|---|---|---|---|
| 3,710,647 | 1/1973 | Dach et al. | 74/866 |
| 3,710,651 | 1/1973 | Marumo et al. | 74/866 |
| 3,719,096 | 3/1973 | Sprague et al. | 74/752 D |
| 3,727,487 | 4/1973 | Forster et al. | 74/867 |
| 3,738,460 | 6/1973 | Murakami et al. | 192/3.58 |
| 3,752,011 | 8/1973 | Casey et al. | 74/866 |
| 3,752,284 | 8/1973 | Brittain et al. | 192/103 F |
| 3,754,482 | 8/1973 | Sanders et al. | 74/752 D |
| 3,942,393 | 3/1976 | Forster et al. | 74/752 A |
| 3,956,947 | 5/1976 | Leising et al. | 74/752 A |
| 4,019,614 | 4/1977 | Prenzel et al. | 192/103 F |
| 4,172,505 | 10/1979 | Rabus et al. | 192/103 C |
| 4,244,244 | 1/1981 | Rembold et al. | 74/752 D |
| 4,282,947 | 8/1981 | Kemper | 192/0.033 |

FOREIGN PATENT DOCUMENTS 1212742 11/1970 United Kingdom ............ 74/752 D

*Primary Examiner*—Leslie A. Braun
*Assistant Examiner*—Joseph M. Rolnicki
*Attorney, Agent, or Firm*—Karl F. Ross; Herbert Dubno

[57] ABSTRACT

A system for controlling the torque to be transmitted by a fluid-operated friction coupling (clutch or brake) in an automatic speed changer comprises a processor which receives readings of the rotary speeds of an input member and an output member to be interengaged by that coupling and calculates the instantaneous relative angular acceleration $\alpha = -d|\Delta n|/dt$ from these data, the value $\alpha$ being supplied to a comparator. A computer receiving the same readings determines the optimum acceleration and feeds the result to the comparator whose output actuates a governor controlling the fluid pressure supplied to the coupling.

5 Claims, 3 Drawing Figures

TORQUE-CONTROL SYSTEM FOR AUTOMATIC SPEED CHANGER SHIFTABLE UNDER LOAD

CROSS-REFERENCE TO RELATED APPLICATION

This application is a continuation-in-part of our copending application Ser. No. 065,106 filed Aug. 9, 1979 and now abandoned.

FIELD OF THE INVENTION

Our present invention relates to an automatic transmission system of the fluid-operated type shiftable under load, e.g. as used in motor vehicles, wherein different speed ratios between an engine-driven input shaft and a load-driving output shaft are established by the selective operation of various elements (clutches and/or brakes) of a friction coupling in response to certain control parameters such as shaft speeds and the position of an accelerator pedal, for example.

BACKGROUND OF THE INVENTION

U.S. Pat. No. 3,727,487 describes various means for electrically adjusting the hydraulic pressure of such a transmission system under the control of the aforementioned parameters. That patent, however, does not discuss the effect of these pressure changes upon the individual clutches and brakes acting as drive-establishing means.

U.S. Pat. No. 3,710,647, owned by the assignee of our present application, teaches the provision of a computer which emits gear-shifting commands under the control of speed sensors coacting with the input and output shafts of the transmission as well as with an engine shaft coupled with the transmission input shaft by way of a torque converter.

Even with such a computerized transmission system, however, an optimum mode of actuation of the hydraulically operated clutches and brakes is not guaranteed. Thus, the progressive engagement of the relatively rotating members of the couplers is conventionally carried out in such a way that the relative rotary speed of these members decreases substantially linearly from its maximum value at the point of cut-in to zero when the engagement is completed. This results in a large gearshift shock both at the beginning and at the end of the engagement process, accompanied by a steep initial rise of friction power. The mechanical effect of the shocks upon the components of the transmission—such as the elements of a planetary-gear train—and the heat generated by the large amount of friction are obviously undesirable phenomena.

OBJECT OF THE INVENTION

The object of our present invention, therefore, is to provide means in such a transmission system for minimizing these phenomena in the operation of a hydraulically actuated friction clutch or brake shiftable under load.

SUMMARY OF THE INVENTION

In accordance with our present invention, the two relatively rotatable members of a friction coupling in a transmission system shiftable under load are provided with sensing means for generating a measuring signal which is proportional to the relative rotary speed of these members. A computer, such as the one disclosed in the aforementioned commonly owned U.S. Pat. No. 3,710,647, is connected to the sensing means for emitting a precalculated reference signal proportional to a predetermined optimum angular acceleration which has been assigned to the measured relative speed. A differentiator also connected to the sensing means generates a monitoring signal which is proportional to the gradient of the relative speed, this monitoring signal being fed together with the reference signal from the computer to a comparator designed to emit an error signal generally proportional to any deviation of the monitoring signal from the reference signal during progressive interengagement of the two clutch or brake members. An electronic control unit or governor is connected between the comparator and a flow regulator associated with the source of hydraulic fluid for modifying the pressure of that fluid—and thus the applied torque—in response to the error signal and in such a manner as to reduce the deviation giving rise to that signal.

Pursuant to a more particular feature of our invention, the computer is programmed to subdivide a range of relative rotary speeds into several—preferably three—subranges in which the angular acceleration, calculated as the time derivative or gradient of the negative absolute value of the relative rotary speed, varies substantially linearly but at different rates, with smooth transition of that relative speed from one subrange to the next. Since this absolute value decreases as the engagement progresses, the acceleration or negative gradient is invariably of positive sign. In principle, two subranges would suffice in which the slope of the acceleration would be positive in a major initial part of the range and would then be negative in a minor terminal part. We prefer, however, to establish three such subranges, i.e. a first one with larger positive slope, a second one with smaller positive slope and a third one with negative slope; we have found it particularly advantageous to let the first subrange extend over the first fifth of the reduction in relative speed (i.e. from its maximum absolute value to about 80% thereof) and to limit the third subrange, in which the slope is reversed, to about the last tenth of that speed reduction (i.e. from approximately 10% of the maximum value to zero).

BRIEF DESCRIPTION OF THE DRAWING

The above and other features of our invention will now be described in detail with reference to the accompanying drawing in which.

SPECIFIC DESCRIPTION

Figure 1:
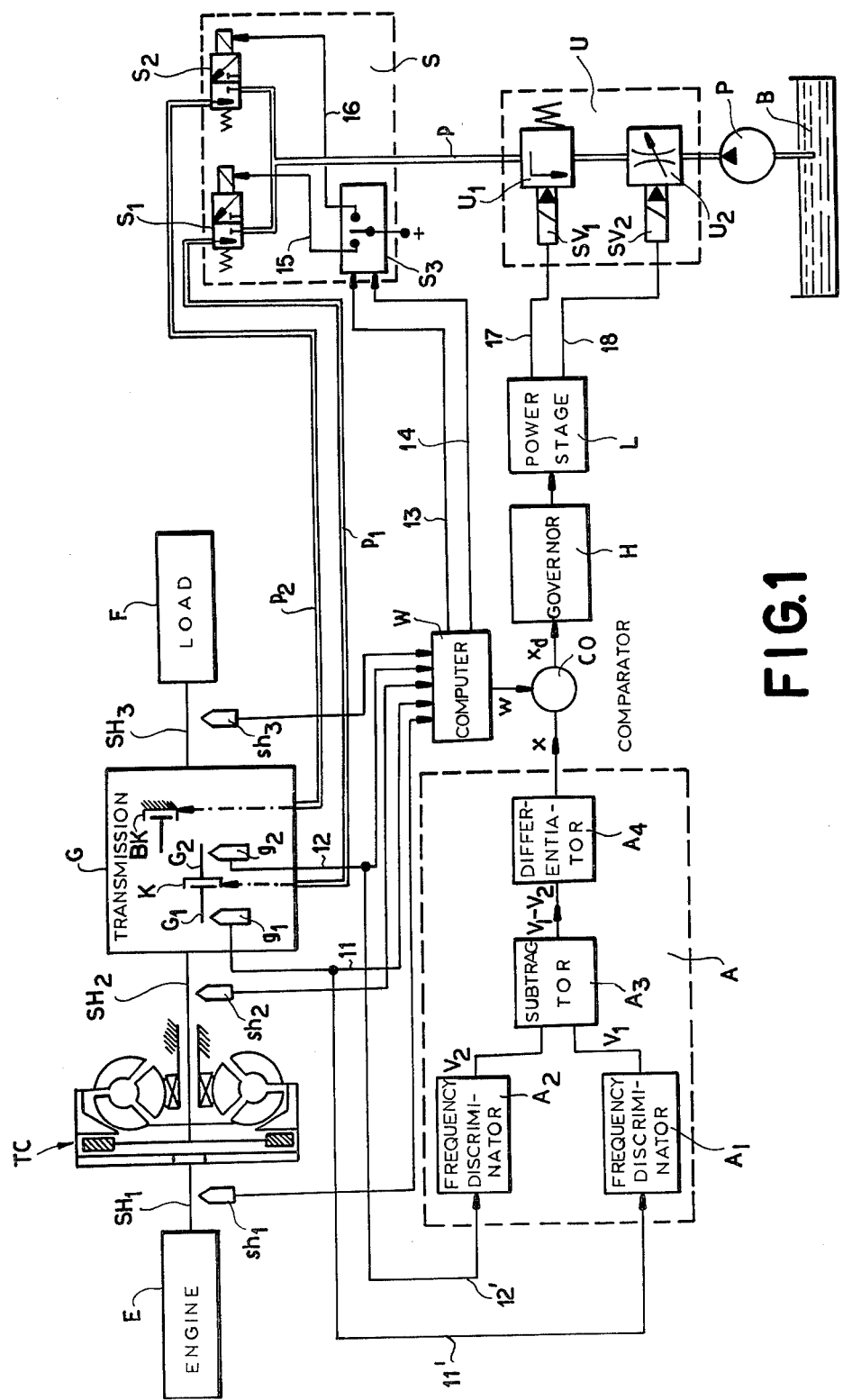
FIG. 1 is a block diagram of an automatic transmission system for an automotive vehicle embodying our invention.

In FIG. 1 we have shown an engine E with a shaft $SH_1$ which drives, via a hydraulic torque converter TC, an input shaft $SH_2$ of a planetary-gear transmission G; a load F, here the traction wheels of an automotive vehicle, is driven by an output shaft $SH_3$ of transmission G. Three speed sensors $sh_1$, $sh_2$, $sh_3$ coact with shafts $SH_1$, $SH_2$, $SH_3$ and deliver respective pulse trains, respresentative of the corresponding shaft speeds, to a computer W generating commands for the establishment of different speed ratios or "gears" in transmission G generally as described in the above-mentioned U.S. Pat. No. 3,710,647.

Transmission G includes the usual drive-establishing means in the form of frictional coupling elements, i.e. clutches K and brakes BK, which are hydraulically operable for gearshifting purposes. The clutch K particularly illustrated comprises an input shaft $G_1$ and an output shaft $G_2$ associated with respective speed sensors $g_1$ and $g_2$ which work into computer W via a pair of leads 11 and 12. Branches 11', 12' of these leads also extend to respective frequency discriminators $A_1$, $A_2$ which form part of a signal processor A and emit voltages $V_1$, $V_2$ proportional to the rotary speeds $n_1$ and $n_2$ of shafts $G_1$ and $G_2$; a subtractor $A_3$ produces a difference voltage $V_1 - V_2$ fed to a differentiator $A_4$ which derives therefrom a voltage x constituting a monitoring signal proportional to the relative speed $\Delta n = n_1 - n_2$ of the two shafts. Such a signal processor A is provided for each of the friction couplings in transmission G; in the case of a brake, however, the output shaft $G_2$ would be replaced by a stationary member so that sensor $g_2$ would be redundant and sensor $g_1$, working directly into the differentiator $A_4$, could be considered operatively coupled to that stationary member and to input shaft $G_1$.

Whenever computer W determines the need for a gearshift from sensors $sh_1$, $sh_2$, $sh_3$ (or possibly from other sensors detecting further parameters, such as the position of a driver-operated accelerator pedal, for example), it commands the engagement or the release of one or more clutches and/or brakes in transmission G. During the engagement process, it receives information on the relative speed $\Delta n$ from the associated sensor or sensors and reads out a reference voltage w proportional to the optimum acceleration $\alpha_o$ associated with the instantaneous value of $\Delta n$ as stored in an internal read-only memory. Signals w and x are fed to a comparator CO which emits an error signal $x_d$ (more fully described hereinafter) to an electronic governor H working into a power stage L.

A pump P driven by engine E delivers hydraulic fluid (oil) from a reservoir or sump B to a line p by way of a flow regulator U comprising a pressure-reducing valve $U_1$ in cascade with a throttle valve $U_2$, these two valves being controlled by respective solenoids $SV_1$ and $SV_2$ with energizing circuits 17 and 18 extending from power stage L. Fluid line p branches into two lines $p_1$ and $p_2$ in which two solenoid valves $S_1$ and $S_2$ are inserted; computer W has output leads 13 and 14 terminating at a switch $S_3$ which energizes either of these valves over a respective connection 15 and 16. Upon such energization, the operated valve $S_1$ or $S_2$ admits oil from supply line p to branch line $p_1$ or $p_2$ for actuation of a respective friction coupling, i.e. clutch K or brake BK, in transmission G.

Figure 2:
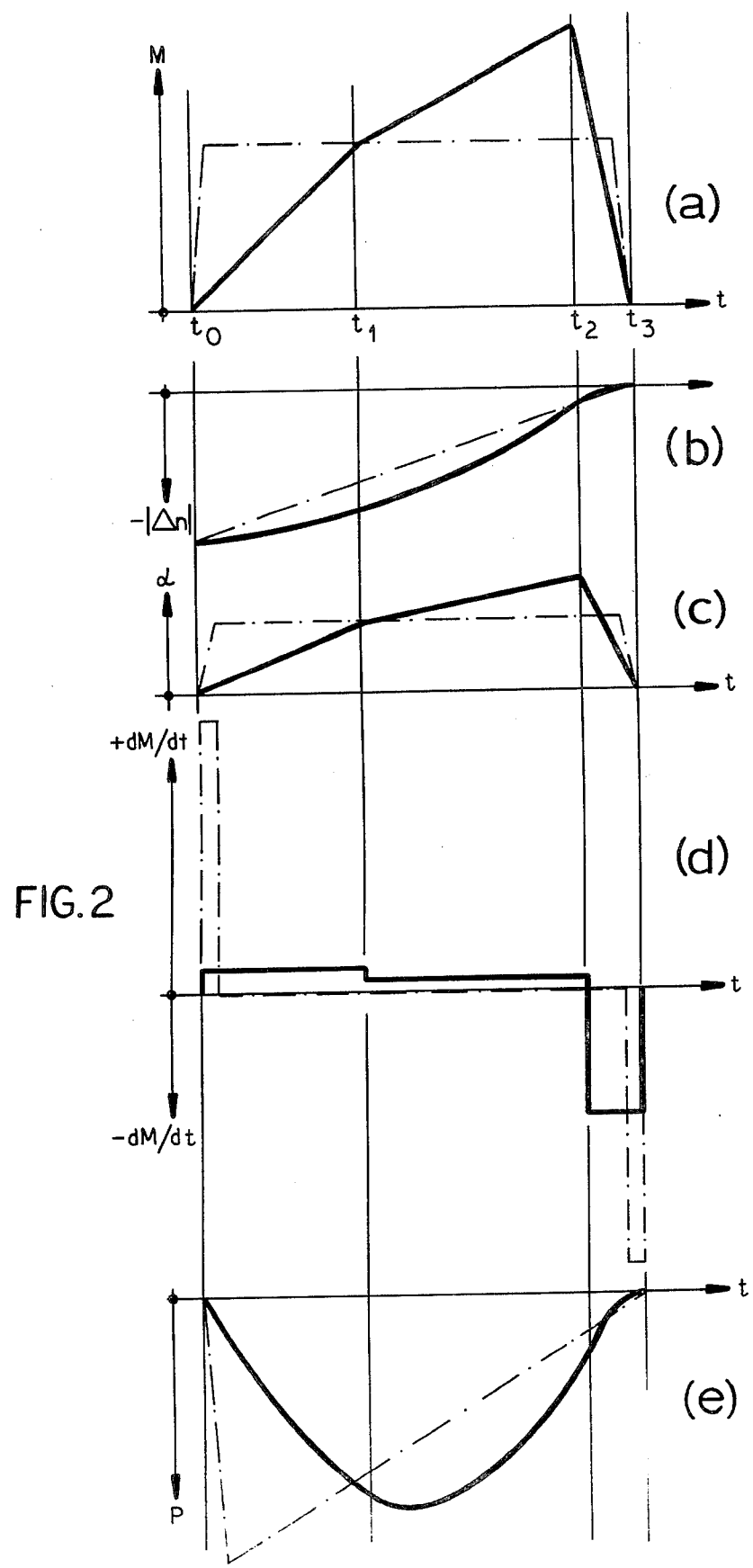
FIG. 2 is a set of graphs relating to the operation of the system of FIG. 1.

Reference will now be made to FIG. 2 for a description of the changes—shown in phantom lines for the conventional procedure and in full lines for the mode of operation of our improved system—during the transition from a maximum difference $\Delta n_{max}$ at a starting instant $t_0$ to a zero difference upon conclusion of the engagement operation at a time $t_3$. Graph (a) of FIG. 2 shows in phantom lines the conventional course of the frictional torque M (given by $$-f_c \frac{d|\Delta n|}{dt}$$

where $f_c$ is the coefficient of friction) rising steeply from zero at time $t_0$ to a constant level from which it begins to return to zero shortly before time $t_3$. The speed difference $-|\Delta n|$ (given as the negative of its absolute value and thus independent of the relative magnitudes of $n_1$ and $n_2$) decrease practically linearly, as shown in phantom lines in graph (b), from its maximum value at time $t_0$ to zero at time $t_3$. The acceleration $$\alpha = -\frac{d|\Delta n|}{dt}$$

assumes almost immediately a positive value which remains practically constant for almost the entire engagement period as shown in phantom lines in graph (c). A resulting gearshift shock given by dM/dt has a sharp positive peak at the beginning and a sharp negative peak at the end of that period, as illustrated in phantom lines in graph (d). The magnitude of the frictional power loss $P = -M|\Delta n|$, shown in phantom lines in graph (e), rises steeply at the beginning of the period and gradually decreases to zero with a substantially constant slope.

Pursuant to our present invention, the period $t_0-t_3$ is divided into three phases $t_0-t_1$, $t_1-t_2$ and $t_2-t_3$ corresponding to respective subranges of the speed range between $\Delta n_{max}$ and zero. The torque M, graph (a), rises linearly in the first phase and again linearly but with a reduced slope in the second phase, thereafter linearly dropping to zero in the third phase. The speed difference $-|\Delta n|$, graph (b), varies throughout its range along a continuous curve which may be considered composed of three parabola segments tangentially merging into one another, the first segment terminating at time $t_1$ when $|\Delta n|$ has decreased to substantially 80% of its original value while the second segment ends at time $t_2$ with $|\Delta n|$ about equal to $0.1 |\Delta n_{max}|$. The derivative of this curve is the acceleration $\alpha$ which, as shown in graph (c), consists of three straight lines with a larger positive slope in the first phase $t_0-t_1$, a smaller positive slope in the second phase $t_1-t_2$, and a negative slope in the third phase $t_2-t_3$.

The gearshift shock dM/dt, graph (d), reaches a rather low positive level in the first phase, drops to an even lower level in the second phase and attains a somewhat higher negative level—still well below that of the peak shown in phantom lines—in the third phase.

The frictional power loss P of graph (e) is of roughly symmetrical shape and gradually reaches a peak, substantially lower in absolute value than that of the phantom-line representation, near the middle of the engagement period.

The system could be simplified by combining the first two phases into a single phase in which the speed difference $|\Delta n|$ decreases to about 10% of its initial value along a curve conforming to a parabola segment of positive first and second derivatives, corresponding to a straight line for the torque M and the acceleration $\alpha$ between times $t_0$ and $t_2$.

The progressive reduction of the speed difference $|\Delta n|$ from its maximum absolute value $|\Delta n_{max}|$ to zero generally involves, in the case of a clutch, a decrease of the input-shaft speed $n_1$ and an increase of the output-shaft speed $n_2$. In the case of a brake, of course, $n_2=0$ and the input shaft is arrested at the end of the engagement process so that $n_1$ is also zero.

The relationship $\Delta n = n_1 - n_2$ applies to the simple case of a single coupling element, such as clutch K, whose full engagement equalizes its input and output speeds. The principles set forth above, however, are equally valid for more complex friction couplings such as planetary-gear trains in which a plurality of such elements, e.g. a clutch and a brake, intervene jointly in the establishment of a desired transmission ratio. In that case the engagement position is characterized by the relationship $n_1 = i \cdot n_2$ where i represents the ultimate transmission ratio. The speed difference $\Delta n$, whose absolute value is taken into account by the computer W (FIG. 1), is then given by $(n_1 - i \cdot n_2)/y$ where y is a constant dependent on the system involved. The correlation between the parameters i, y and the tooth ratios of specific planetary-gear transmission systems is well known in the art and has been discussed in an article entitled Simulation der Schaltung von Gruppengetrieben mit Hilfe elektronischer Rechenanlagen, published by ATZ Aytomobiltechnische Zeitschrift, Vol. 74/9 (1972), pages 343-348, and Vol. 74/11 (1972), pages 452-455, in the German Federal Republic. Thus, for example, in a system with a driving sun gear, driven planet carrier and statitionary ring gear, where $Z_a$ and $Z_c$ are the number of teeth in the sun and ring gears, respectively, $i = 1 + Z_c/Z_a$ and $y = i - 1$. With the aforementioned simple one-clutch (or one-brake) system, of course, $i = y = 1$.

Figure 3:
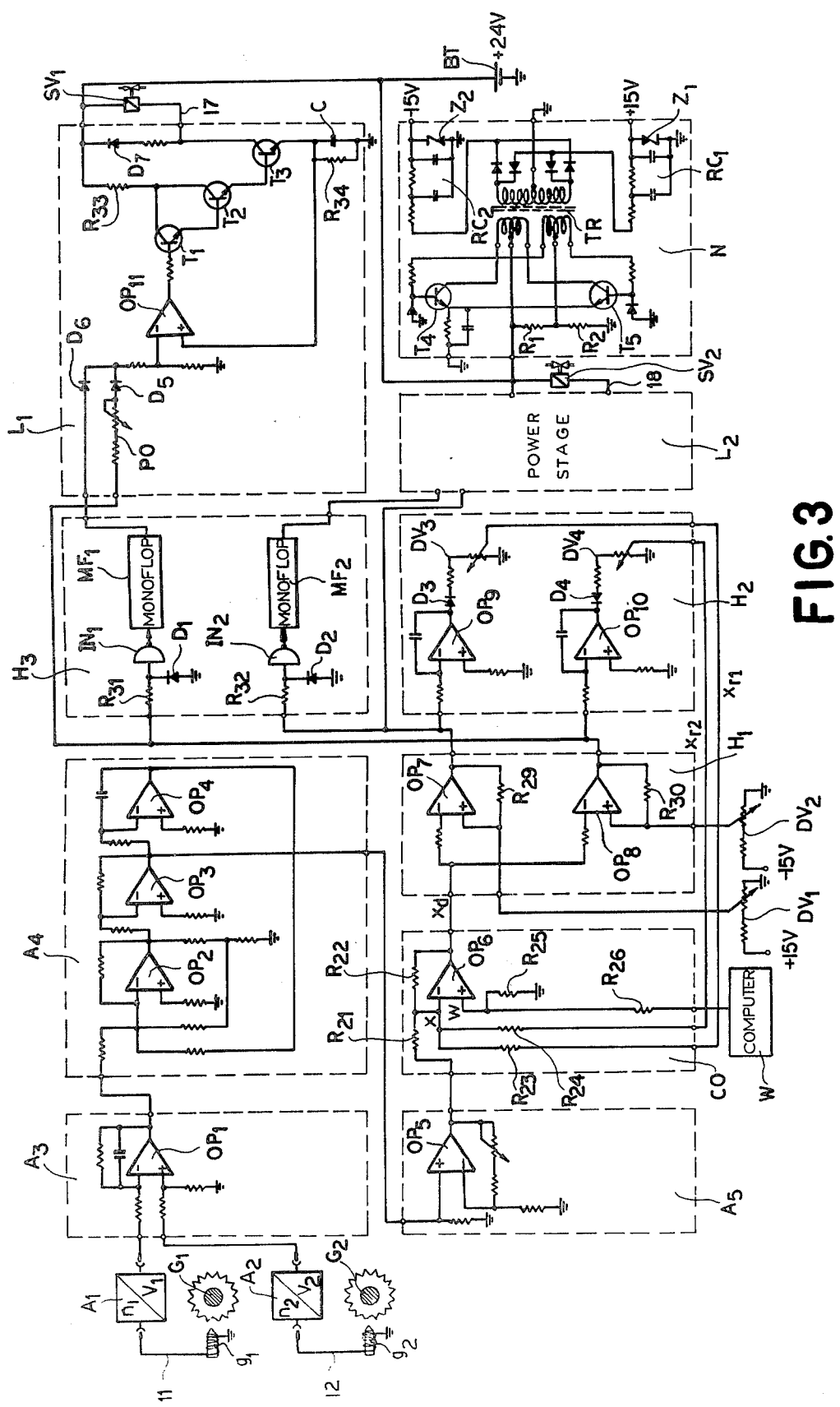
FIG. 3 is a more detailed diagram of the circuitry for controlling the hydraulic actuating pressure of a friction clutch in the transmission system.

FIG. 3 shows the frequency/voltage converters $A_1$ and $A_2$ of the processor A, associated with the clutch K of FIG. 1, respectively connected to an inverting and a noninverting input of an operational amplifier $OP_1$ forming part of the subtractor $A_3$. Differntiator $A_4$ is formed by three cascaded operational amplifiers $OP_2$, $OP_3$ and $OP_4$, the last amplifier $OP_4$ being connected as an integrator in a feedback path to the inverting input of first-stage amplifier $OP_2$. The output signal of differentiator $A_3$ is magnified once more in a stage $A_5$, comprising an operational amplifier $OP_5$, before being fed as the monitoring signal x to an inverting input of an operational amplifier $OP_6$ forming part of comparator CO; this inverting input is connected to the junction of two resistors $R_{21}$ and $R_{22}$ serially inserted between the outputs of amplifiers $OP_5$ and $OP_6$. Reference signal w appears at the noninverting input of amplifier $OP_6$ tied to the junction of two resistors $R_{25}$ and $R_{26}$ which are inserted between ground and the output of computer W; resistors $R_{25}$ and $R_{26}$ have a ratio equal to that of resistors $R_{22}$ and $R_{21}$. Two further resistors $R_{23}$ and $R_{24}$, each equal in magnitude to resistor $R_{21}$, are connected in parallel to the inverting input of amplifier $OP_6$ and are included in a feedback path extending from an integrator stage $H_2$ connected to comparator CO via a switching stage $H_1$ forming part of governor H. The latter stage comprises two operational amplifiers $OP_7$ and $OP_8$ having inverting inputs connected in parallel, via respective resistors, to the output of amplifier $OP_6$ to receive therefrom the error signal $x_d$. The output of amplifier $OP_7$ is connected through a resistor $R_{29}$ to its noninverting input and to a tap on a voltage divider $DV_1$ lying between ground and a terminal of +15 V. Analogously, the output of amplifier $OP_8$ is connected through a resistor $R_{30}$ to its noninverting input and to a tap of a voltage divider $DV_2$ inserted between ground and a terminal of -15 V. Thus, resistors $R_{29}$ and $R_{30}$ provide positive feedback designed to stabilize the operation of switching stage $H_1$.

Stage $H_2$ comprises two integrating operational amplifiers $OP_9$ and $OP_{10}$ with inverting inputs respectively connected to the outputs of amplfiers $OP_7$ and $OP_8$, feeding back integrated voltages $x_{r1}$ and $x_{r2}$ to the inverting input of amplifier $OP_6$ by way of resistors $R_{23}$ and $R_{24}$, respectively. Thus, the error signal $x_d$ is given by $(R_{22}/R_{21}) \cdot [w - (x + x_{r1} + x_{r2})]$. The magnitudes of feedback voltages $x_{r1}$ and $x_{r2}$ are adjustable by respective potentiometers forming part of two voltage dividers $DV_3$, $DV_4$ in series with two oppositely connected diodes $D_3$ and $D_4$.

The output of amplifier $OP_8$ is further connected by way of a potentiometer PO and a diode $D_5$ to the inverting input of an operational amplifier $OP_{11}$, forming part of a section $L_1$ of power stage L, and in parallel therewith to a resistor $R_{31}$ in a third section $H_3$ of governor H. Resistor $R_{31}$ is connected to the cathode of a diode $D_1$ with grounded anode and in parallel therewith, through an inverter $IN_1$, to a trigger input of a monoflop $MF_1$. The output of this monoflop is also connected, via a diode $D_6$, to the inverting input of amplifier $OP_{11}$ whose output is connected to the base of an NPN transistor $T_1$ forming a Darlington chain with two similar transistors $T_2$ and $T_3$. A battery BT with grounded negative pole and positive pole of +24 V energizes the collectors of transistors $T_1$, $T_2$ via a resistor $R_{33}$; solenoid $SV_1$, controlling the pressure-reducing valve $U_1$ of FIG. 1, is inserted between that positive pole and the collector of transistor $T_3$ in parallel with a protective diode $D_7$ connected in bucking relationship with that transistor. The emitter of transistor $T_3$ is grounded through a resistor $R_{34}$, shunted by a capacitor C, and is also connected to the noninverting input of amplifier $OP_{11}$.

In an analogous manner, the output of amplifier $OP_7$ is further connected to a section $L_2$ of power stage L, identical with section $L_1$, and in parallel therewith to a resistor $R_{32}$ in governor section $H_3$. Resistor $R_{32}$ is connected to the cathode of another diode $D_2$ with grounded anode and in parallel therewith, again through an inverter $IN_2$, to a trigger input of a monoflop $MF_2$ whose output extends along with that of amplifier $OP_7$ to an inverting input of the counterpart of amplifier $OP_{11}$. Solenoid $SV_2$, controlling the throttle valve $U_2$ of FIG. 1, lies between battery BT and the collector of the last transistor of a Darlington chain in section $L_2$.

The voltage of battery BT is also fed to the midpoint of a primary winding of a transformer TR in an a-c/d-c converter N generating the stabilized biasing voltages of +15 V and -15 V for voltage dividers $DV_1$ and $DV_2$. This primary winding is connected across the collectors of two NPN transistors $T_4$, $T_5$ of a push-pull oscillator having their bases connected across a feedback winding of that transformer whose midpoint is biased from a voltage divider constituted by two series resistors $R_1$, $R_2$ which are inserted between battery BT and ground. A secondary winding of transformer TR has a grounded midpoint and extremities connected to ground by way of two time-constant networks $RC_1$, $RC_2$ terminated by respective Zener diodes $Z_1$, $Z_2$; the underground terminals of these networks carry the two biasing voltages whose magnitudes of +15 V remain substantially constant even if the battery voltage varies between as much as +19 V and +30 V.

With the aid of these biasing voltages, and upon proper adjustment of the potentiometer portions of voltage dividers $DV_1$ and $DV_2$, it is possible to maintain the noninverting input of operational amplifier $OP_7$ at a fraction of a volt positive and that of operational amplifier $OP_8$ at a fraction of a volt negative, e.g. $+0.5$ V and $-0.5$ V, respectively, as long as the error signal $x_d$ is zero. Under these conditions there will be no feedback from section $H_2$ because of the blocking effect of diodes $D_3$ and $D_4$ in the outputs of amplifiers $OP_9$ and $OP_{10}$. Such feedback will also be absent when, at the beginning of the engagement operation, the absolute value of the actual speed gradient $\alpha$ is less than that of the optimum acceleration read out from computer W for the measured speed difference $\Delta n$; since monitoring and reference signals x and w both have negative sign; error signal $x_d$ will be negative under these circumstances. The positive output voltage of amplifier $OP_7$, passed by the counterparts of diodes $D_5$ and $D_6$ in section $L_2$, will then control the solenoid $SV_2$ for a continuous adjustment of throttle valve $U_2$ (FIG. 1) to hold that error signal close to zero. The negative output voltage of amplifier $OP_8$ is prevented by diodes $D_5$ and $D_6$ from having any effect on the operation of solenoid $SV_1$ so that valve $U_1$ controlled by that solenoid sets a high limit for the pressure of the oil admitted to the particular friction coupling, here specifically clutch K, whose engagement is being commanded by the computer W.

Reference signal w, of course, conforms essentially to the acceleration $\alpha$ shown in graph (c) of FIG. 2. Thus, when the computer detects a reduction of $|\Delta n|$ to about 10% of its original value, it sharply decreases the absolute value of signal w whereby error signal $x_d$ goes positive, causing amplifiers $OP_7$ and $OP_8$ to switch over into an alternate state in which the polarities of their output signals are interchanged. Negative output voltage of amplifier $OP_7$ then trips the monoflap $MF_2$ so that, for a limited period, the oil flow in line p (FIG. 1) is only partially throttled by valve $U_2$ while positive output voltage of amplifier $OP_8$ lowers the pressure level established by valve $U_1$, thus ensuring a smooth transition between the last two phases.

After the switchover of amplifiers $OP_7$ and $OP_8$, integrated feedback signals $x_{r1}$ (positive) and $x_{r2}$ (negative) appear in the outputs of amplifiers $OP_9$ and $OP_{10}$, respectively. The magnitudes of these feedback signals are so adjusted, with the aid of voltage dividers $DV_3$ and $DV_4$, that their combined effect stabilizes the conditions so established whereby only a reduced oil flow passes the throttle valve $U_2$ and the engagement pressure is modulated by the error signal $x_d$.

When, upon completion of the engagement operation, signal $x_d$ again goes negative, monoflap $MF_1$ prevents any immediate increase in the pressure limit while valve $S_1$ in FIG. 1 is reversed to connect fluid line $p_1$ to another hydraulic circuit controlling the maintenance of the engagement and any subsequent disengagement of clutch K by conventional means.

We claim:

1. In a transmission system shiftable under load provided with a gear-shifting stage comprising a friction coupling with relatively rotatable input and output members that are progressively interengageable by hydraulic fluid from a source provided with flow-regulating means, the combination therewith of:
sensing means operatively coupled with said members for generating a measuring signal proportional to the relative rotary speed thereof calculated as an absolute difference of respective speeds of said members;
computer means connected to said sensing means for emitting a precalculated reference signal proportional to a predetermined optimum angular acceleration assigned to said relative rotary speed;
differentiation means connected to said sensing means for generating a monitoring signal proportional to a gradient of said relative rotary speed calculated as a differential quotient thereof with respect to time;
comparison means with input connections to said computer means and to said differentiation means for emitting an error signal generally proportional to any deviation of said monitoring signal from said reference signal during progressive interengagement of said members; and
electronic control means connected between said comparison means and said flow-regulating means for modifying a pressure of said hydraulic fluid in response to said error signal to reduce said deviation, said computer means being programmed to subdivide a range of relative rotary speeds between an initial maximum and zero into a plurality of subranges in which said angular acceleration varies substantially linearly at different rates, with a smooth transition of said relative rotary speed from one subrange to the next and a single change of sign of the time differential of said angular acceleration between the next-to-last subrange and the last subrange at the zero end of said range.

2. The combination defined in claim 1 wherein said flow-regulating means comprises a throttle valve and a pressure-reducing valve in cascade, said control means including two circuit branches for respectively operating said valves.

3. The combination defined in claim 2 wherein each of said circuit branches includes a switching circuit trippable by a polarity reversal of said error signal and delay means for retarding the effect of polarity reversals proceeding in a predetermined direction.

4. The combination defined in claim 1, 2 or 3 wherein said subranges are a first, a second and a third subrange in which said angular acceleration, calculated as the gradient of the negative absolute value of said relative rotary speed, respectively has a larger positive slope, a smaller positive slope and a negative slope.

5. The combination defined in claim 4 wherein said first subrange extends from a maximum of said absolute value to substantially four fifths of said maximum, said second subrange extending from the end of said first subrange to substantially one tenth of said maximum, said third subrange extending from the end of said second subrange to zero relative rotary speed.

* * * * *